United States Patent Office 2,962,362
Patented Nov. 29, 1960

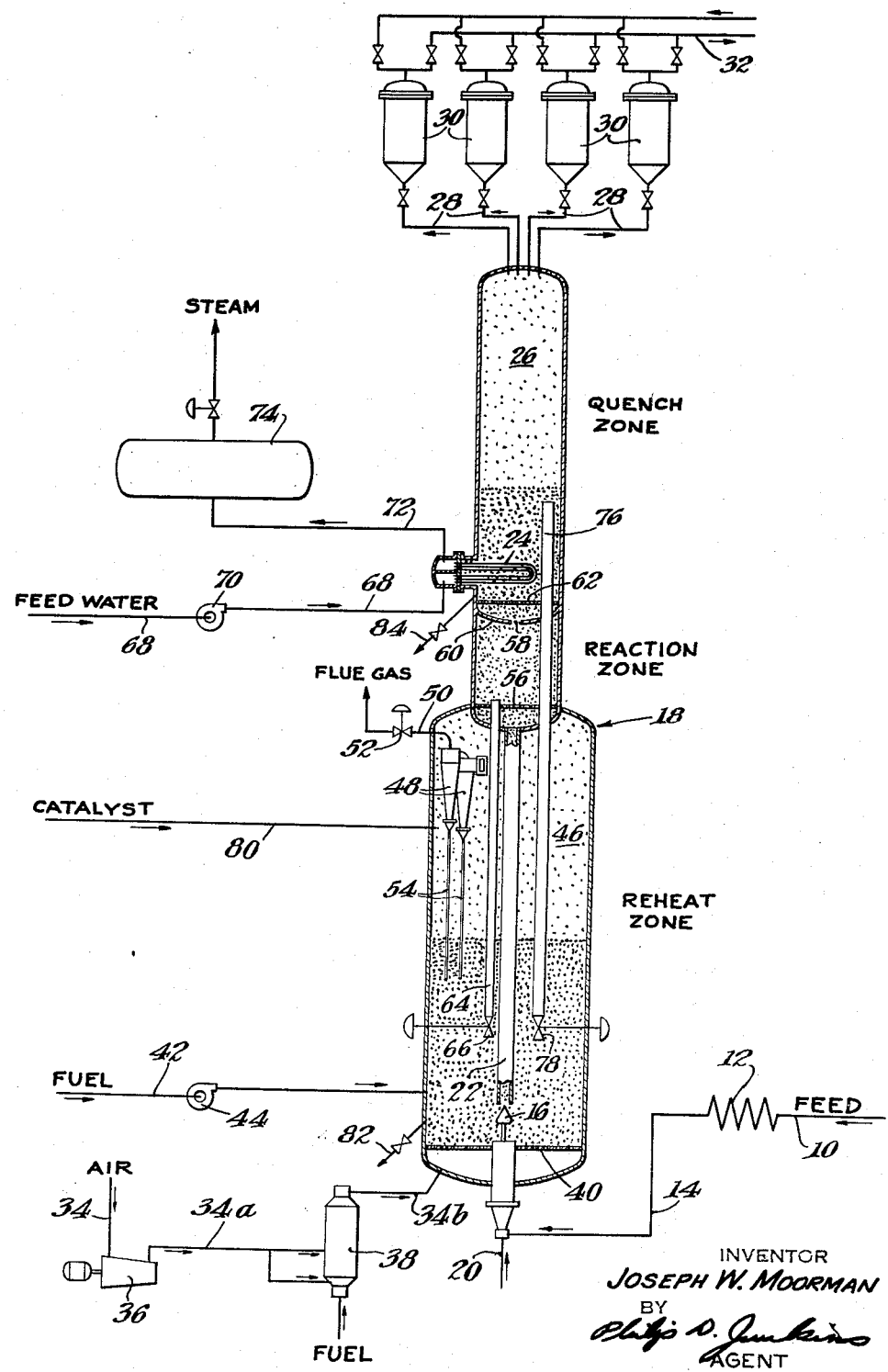

2,962,362

CATALYTIC DEHYDROGENATION APPARATUS

Joseph W. Moorman, Tulsa, Okla., assignor to The Lummus Company, New York, N.Y., a corporation of Delaware Filed Feb. 20, 1956, Ser. No. 566,415

1 Claim. (Cl. 23—288)

This invention relates to improvements in process, and apparatus, for effecting the catalytic dehydrogenation of light hydrocarbons and more particularly those dehydrogenation reactions requiring short conversion periods at elevated temperatures followed by a rapid cooling of the products of reaction to a temperature at which substantially no further reaction occurs.

Heretofore, certain catalytic dehydrogenation reactions have been known and practiced on a very small scale, but since they were not amenable to satisfactory practice in large apparatus and under commercial conditions, have remained merely of academic interest. This type of reaction, in general, requires that a gaseous reactant or combination of reactants be brought up to an elevated temperature in a short period of time and, in many instances, likewise maintained at this temperature for a very short period. The provision of a method and apparatus whereby such reactions may be carried out with satisfactory yields of the desired products on a large commercially feasible scale, and with commercially available apparatus, constitutes a primary object of my invention.

A further object of my invention is the provision of method and apparatus whereby endothermic catalytic dehydrogenation reactions requiring the maintenance of a reactant, or reactants, at specified temperatures for an extremely short period of time may be satisfactorily accomplished in a single reaction vessel containing three fluidized zones and which are not subject to the limitations entailed by the supplying of the necessary heat largely or entirely by means of indirect heat exchange.

Pursuant to the present invention a stream of the gaseous reactant such as light hydrocarbon, is mixed with heated particles of a solid catalytic material, the particles thus added serving as both a heat carrier and catalyst and being at a temperature and in sufficient amount to substantially instantaneously heat the gaseous reactant to and maintain it at the required conversion temperature.

A further feature of the process comprises quickly cooling the stream of conversion products to a temperature level at which undesired reactions are precluded, by passing them to a suitable cooling or quenching zone, this zone preferably comprising a cooled fluidized bed of the catalytic contact material.

Various other features, advantages and objects of my invention will be apparent from the following detailed description thereof given in connection with the appended drawing.

The appended drawing illustrates diagrammatically a suitable arrangement of apparatus, and process flow, for the practice of the invention pursuant to one illustrative embodiment. As shown therein, the process may suitably involve three primary zones within a single reaction vessel comprising a, reheat zone wherein particles of solid contact material are preheated to a suitable temperature, a conversion or reaction zone wherein the solid particles are suspended in and contacts with a stream of the gaseous reactant for the requisite short period of time and a cooling or quenching zone wherein the temperature of the conversion products is rapidly lowered to a desired level.

The particles of solid contact material such as catalyst may be preheated to the required temperature for introduction into the reaction zone by the combustion of suitable liquid or gaseous fuel within such zone in the presence of preheated fluidizing air. The preferred procedure as shown in the drawing consists in heating these particles under conditions wherein they constitute a fluidized bed, hereafter referred to as the dense phase portion of the reheating zone. This particular condition in general is characterized by the relatively high concentration of particles of solid contact agent, and by the maintained low velocity flow of heating gas upwardly through the zone. The maintenance of a definite minimum gaseous velocity is regarded as desirable to maintain the bed in a turbulent fluidized state. Preferably, the upward velocity of the gas through the heating zone is sufficiently high to maintain the dense phase of solid particles in a turbulent condition whereby the individual particles are caused to circulate throughout the dense phase zone. This turbulent and circulatory motion of the solid particles results in the maintenance of a substantially uniform temperature throughout the dense phase of the reheat zone. The optimum velocity both with respect to its minimum and maximum value will be dependent upon the density, size and shape of the solid particles employed and the density and velocity of the heating gas, so that for any particular size or sizes of particles and quantity of heating gas, this velocity is adjusted within a range so as to maintain the desired turbulent dense phase condition.

The dense phase portion of particles of solid contact material such as catalyst extends only partially through the reheat zone. The space in the reheat zone above this level constitutes a solid-vapor disengaging space, accordingly only a relatively small proportion if any of the total quantity of contact material within the reheat zone is carried out with the heating gases leaving such zone.

The heated particles of solid contact material are withdrawn from the dense phase portion of the reheat zone as described hereinafter for promoting reactions such as the catalytic conversion or dehydrogenation of light hydrocarbons.

The embodiment of the invention illustrated in the drawing will be described with particular reference to the use of such embodiment in carrying out the dehydrogenation of normal butane to butylene, though as previously pointed out, the apparatus and process can be applied to various other dehydrogenation type reactions. Normal butane feed is supplied from a suitable source and is then pumped into line 10 and through feed preheat furnace 12 wherein the feed is preheated to a temperature of from 800° F. to 1000° F. From the furnace, the heated hydrocarbon flows through line 14 and enters a cone valve 16 located at the base of the reheat zone of vessel 18. Feed, along with an inert gas which may enter through line 20, if required, passes through the central portion of the conical valve 16 and enters catalyst riser 22. Due to the velocity of the vaporized butane in the riser pipe 22, catalyst in the reheat zone is ejected into the riser. The catalyst in the reheat zone has been heated as hereinafter described to about 1200° F. and a sufficient quantity of such catalyst is included in the rising stream through the influence of the valve opening and the velocity in the riser to raise the temperature of the butane feed to about 1100° F.

The catalyst and hydrocarbon mixture in riser 22 then enters the reaction zone of the reactor wherein the dehydrogenation reaction occurs. The reaction zone which includes the riser 22 is of a volume so that sufficient contact time of the butane with the catalyst can be realized in order to carry out the reaction at a desired conversion level. Upon leaving the reaction zone, the catalyst and hydrocarbon mixture enters a zone of sub-cooled fluidized catalyst. In this quench zone, the catalyst is sub-cooled by means of submerged exchanger coils 24 through which cooling water is pumped to control the quench zone temperature. As a result, it is possible to quench almost immediately the reaction products from the aforementioned reaction temperature of about 1100° F. to a temperature at which no further reaction occurs or about 800° F. At this latter temperature, practically no thermal side reactions will occur.

From the fluidized quench zone catalyst bed, the reaction products pass through a disengaging space 26 wherein most of the entrained catalyst is removed. The reaction products then leave vessel 18 through lines 28 and enter a series of filters 30 wherein all the remaining catalyst is eliminated from the gaseous stream. Gaseous products from the filters are collected in line 32 and are cooled in an exchanger (not shown) to about 150° F. after which they enter a recovery system (not shown) that is applicable to the particular constituents desired.

The vessel 18 itself consists of three major sections. The first has been termed a reheat zone and contains a bed of catalyst which is maintained in a fluidized condition and is heated by means of the combustion of suitable fuel and the application of preheated air. The air is supplied through line 34 by means of an air compressor wherein such air is compressed to suitable pressure. The compressed air leaving the compressor 36 in line 34a is preheated in preheater 38 to approximately 1000° F. and is then passed to the reheat zone of reactor 18 through line 34b wherein it fluidizes the catalyst contained in such zone above grid 40. Fuel for heating the catalyst in the reheat zone enters through line 42 and pump 44. Flue gases resulting from the combustion of the fuel in the air heater and the fuel that is injected into reactor 18 by pump 44 leave the fluidized bed and pass through a catalyst disengaging space 46 and two stages of cyclone separators 48 and thence through line 50 and control valve 52 to the atmosphere. The control valve 52 maintains the required pressure on the dilute phase of the reheat section. Disengaged catalyst is returned to the bed from separators 48 through lines 54.

The hot catalyst along with fresh feed enters the riser 22 at a rate which is controlled by means of the conical valve 16. The rate will control the temperatures of the reaction zone located immediately above the reheat zone in vessel 18. Under the proposed conditions, this temperature will be controlled at a level of approximately 1100° F. It has been found that an increase of approximately 50° in this temperature range will result in marked increase in conversion level.

From the reaction zone above grid 56, the gaseous reaction products and unreacted feed pass through opening 58 in plate 60 and then through grid 62, which forms the bottom of the quench zone. Disentrained catalyst in the reaction zone may be returned to the reheat zone through downcomer 64 at a rate controlled by valve 66 therein.

In the quench zone, catalyst is maintained in a fluidized condition and is cooled by means of submerged heat exchanger coils 24 through which feed water from line 68 is pumped by pump 70 and then discharged through line 72 into steam drum 74. Upon leaving the fluidized bed in the quench zone, reaction products and unreacted products enter filters 30 and proceed as described previously. The catalyst that has been disentrained and the catalyst that has been required for circulation in order to maintain the proper reactor temperature, is returned to the reheat zone through a standpipe 76 and slide valve 78 located at the base of the standpipe. The total catalyst circulation rate, therefore, is determined by the amount of catalyst entrained from the reaction zone and the amount of catalyst required to maintain the proper reactor tempearture. If the slide valve located at the base of the standpipe 76 is shut off entirely, eventually all of the catalyst in the reaction zone would be entrained into the quench zone. Therefore, it is essential that provision be made to return the entrained catalyst. The total quantity of catalyst required, however, to maintain a proper reactor temperature is far in excess of natural entrained characteristics of the fluidized catalyst. Consequently, the design of the standpipe must be based entirely upon the heat load required to maintain the proper reactor temperature and the fuel supply to the reheat zone is based upon this quantity of catalyst, and the primary duty in the reheat zone is raising the temperature level of this amount of catalyst from approximately 800° F. to approximately 1200° F. Standpipe 64 acts primarily as an alternate standpipe to permit circulation of catalyst directly from the reaction zone through reheat zone, thereby reducing the load on the reheat zone. Additional catalyst as desired may enter the reheat zone through line 80.

Where the reheat zone or the quench zone tend to overload with catalyst the excess over operation requirements may be withdrawn through lines 82 and 84 respectively.

The particles of solid catalyst utilized are preferably of a refractory character adapted to be subjected to the elevated temperatures involved without being fused. Such refractory type catalyst not only will be catalytic in nature as required in the above described embodiments but will serve as a heat carrier to promote such reactions.

It will be apparent to those skilled in the art that such factors entering into the process as, (1) temperature and quantity of the catalytic material introduced into the reaction zone, (2) the temperature of the reaction zone, (3) the time of contact in the reaction zone and consequent dimensions of the reaction zone, and (4) temperature of the cooling zone, will be dependent upon the particular reaction involved and the intermediate conversion product desired. Accordingly, these factors in any given instance are selected and regulated in accordance with the particular dehydrogenation reaction involved and the products desired. The practice of the process, however, may be further exemplified by the following example of operating conditions suitable for the production of butylene pursuant to the dehydrogenation of normal butane in the presence of a catalyst of high chrome oxide or high chrome alumina composition.

*Example*

| | Quantity, lbs./hr. | Temp., °F. |
|---|---|---|
| Feed: N-Butane (after heater 12) | 4,290 | 900 |
| Particles of catalyst (riser 22) | 96,000 | 1,200 |
| Reaction zone conditions | | 1,100 |
| Velocity in reaction zone, 1.82 ft./sec. | | |
| Velocity in quench zone, 1.98 ft./sec. | | |

Under the above conditions the process yield included the following gaseous reaction products:

| Product | lbs./hr. | Product | lbs./hr. |
|---|---|---|---|
| $C_4H_{10}$ | 2,144 | $C_2H_6$ | 22.6 |
| $C_4H_8$ | 1,953 | $C_2H_4$ | 23.3 |
| $C_3H_8$ | 8.25 | $CH_4$ | 21.25 |
| $C_3H_6$ | 39.0 | $H_2$ | 70.0 |

It is to be understood that the above example and conditions are merely illustrative and that the process may be applied to a wide variety of dehydrogenation reactions requiring that a gaseous reactant be heated to an elevated temperature in a very short space of time and maintained at such a temperature during a short reaction period thereafter being quickly cooled to below reaction temperatures.

I claim:

Apparatus for effecting the endothermic conversion of hydrocarbon reactants during passage through a reaction chamber in contact with hot contact particles: comprising an elongated reaction vessel including a lower reheat chamber, an intermediate reaction chamber, and an upper quench chamber in successive communicating alignment and each being adapted to maintain zones of fluidized contact particles therein; a reactant inlet in said reaction vessel for admitting hydrocarbon reactants to said reheat chamber; a riser conduit within said reheat chamber and communicating with said reaction chamber, said riser being adapted to receive reheated contact particles from said reheat chamber and hydrocarbon reactants from said reactant inlet for passage to said reaction chamber as a fluidized mixture; a perforated partition between said upper chamber and said reaction chamber through which gaseous reaction products and entrained contact particles pass to said upper chanmber; heat exchange means within said upper chamber to cool said entrained contact particles and gaseous reaction products passing through said chamber to a temperature at which substantially no further conversion occurs; conduit means for transferring cooled contact particles from said upper chamber to said lower chamber for reheating therein; a reaction product outlet in said reaction vessel for removing cooled gaseous products from said upper quench chamber; and means to reheat the contact particles returned to said lower chamber.

References Cited in the file of this patent

UNITED STATES PATENTS

| | | |
|---|---|---|
| 2,403,375 | Kassel | July 2, 1946 |
| 2,479,496 | Keith | Aug. 16, 1949 |
| 2,508,993 | Crowley | May 23, 1950 |
| 2,671,102 | Jewell | Mar. 2, 1954 |
| 2,679,540 | Berg | May 25, 1954 |
| 2,731,395 | Jahnig et al. | Jan. 17, 1956 |